Patented Aug. 13, 1946

2,405,806

UNITED STATES PATENT OFFICE 2,405,806

DERIVATIVES OF RESINOUS ETHERS OF HYDROXYARYL COMPOUNDS

Otto Albrecht, Neue-Welt, near Basel, Charles Graenacher, Riehen, Richard Sallmann, Bottmingen, and Carlo Rossi, Basel, Switzerland, assignors to Society of Chemical Industry in Basle, Basel, Switzerland No Drawing. Application February 2, 1942, Serial No. 429,336. In Switzerland February 7, 1941

14 Claims. (Cl. 260—51)

It has been found that new condensation products are obtained if resinous compounds which contain at least one ether bridge derived from a hydroxyaryl group are converted into derivatives containing halogenmethyl groups by treatment with agents known to introduce halogenmethyl groups, for instance, with formaldehyde and a hydrogen halide, or with compounds derived from these components, and, if desired, if at least one of the halogen atoms contained in these derivatives be exchanged for a group which confers or enhances solubility in water.

Resinous compounds which contain at least one ether bridge derived from a hydroxyaryl group and which may be used as parent materials in the present invention are, for example, resinous ethers, which may be derived, on the one hand, either from aromatic mono- or polyvalent hydroxy compounds, for example, from phenol, resorcinol, hydroquinone, α-naphthol, β-naphthol, parahydroxydiphenyl, para:para'-dihydroxydiphenylmethane, 1:1-di-(para - hydroxyphenyl)-ethane, or from alkylated hydroxy compounds of the aromatic series, such as cresols, para-tertiary amyl-phenol, or from substituted aromatic hydroxy compounds, such as chlorophenol, para:para'-dihydroxydiphenyl sulfone, para-hydroxydiphenyl ether and, on the other hand, from terpene alcohols or from terpene hydrocarbons. Among the terpene alcohols or terpenes mentioned above, the following may be mentioned in particular: terpineols, pine oil, pinene, dipentene, terpinolenes, terpinenes and similar compounds. These resinous ethers, which may also contain unetherified hydroxy groups united to aryl nuclei, can be obtained in known manner, for example, by heating the components, for instance, to 100–160° C., in the presence of acid reacting compounds, such as sulfuric acid or paratoluene sulfonic acid. Such resinous ethers are also described, for example, in French Patent No. 539,494 and in British Patent No. 504,417.

For the conversion into the derivative containing the halogenmethyl group, the resinous ethers are preferably treated with α:α'-dihalogendimethyl ethers, for example, with α:α'-dichloro- or α:α'-dibromodimethyl ether, that is to say, with compounds which are derived from formaldehyde and hydrogen halides. This reaction is preferably carried out at about 40–100° C., if desired, in the presence of substances which act as accelerators, such as anhydrous zinc chloride. The α:α'-dihalogen-dimethyl ethers used in this reaction react in an unsymmetrical manner, products being formed which contain at least once the very reactive atomic grouping —CH₂— halogen.

The reactive halogen atoms present in the halogen derivatives can be very easily converted into water-solubilizing groups by known methods. By causing them to react with tertiary amines, such as pyridine, triethylamine, or with primary and secondary amines, radicals containing quaternary ammonium groups or amino groups can be introduced. By treatment with thioureas, which are capable of reacting in the iso-form, or with cyanamide or dicyandiamide and similar compounds, the corresponding radicals, which also confer water-solubility in the salt form, can also be introduced. The compounds mentioned above, i. e. amines, thioureas and dicyandiamide contain nitrogen atoms. They differ from other compounds used to introduce groups lending water-solubility by the fact that they are either basic themselves or may easily be transformed into basic derivatives, for instance, by reaction with halogenmethyl derivatives. Therefore, the products obtained by condensing halogenmethyl derivatives with amines, thioureas capable of reacting in the isoform or dicyandiamide contain basic nitrogen atoms, are cationactive, and owing to this cationactivity they are easily absorbed by textile fibers. In other words, those products of the invention which contain a basic nitrogen atom are especially effective for the improvement of textiles; compartively low quantities of these cation-active compounds will be sufficient to produce valuable effects, since they are readily absorbed by fibers such as cellulose fibers.

Thioureas capable of reacting in the isoform contain at least one hydrogen atom, as every expert knows. They react as if the atom grouping

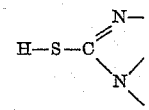

were present in the molecule. Therefore, in the reaction of a halogenmethyl derivative with a thiourea capable of reacting in the isoform an isothiourea radical of the formula

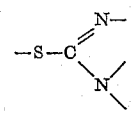

in salt form is introduced, the substitution taking place at the sulfur atom.

If dicyandiamide is used instead of the above mentioned thioureas a radical derived from dicyandiamide, however of unknown constitution, is introduced. Furthermore, thiosulfate or polyglycol ether radicals can also be introduced in known manner by means of thiosulfates or polyglycols or ethylene oxide.

By suitable choice of the parent materials, the products of the present invention can find application as auxiliary products, for example, in the textile, leather and paper industries. The water-soluble, cationactive products are especially suitable for rendering rayon fabrics fast to slipping, the tendency of the warp and weft threads to slip under mechanical strain being reduced. The water-soluble compounds of high molecular weight can also be used to influence the handle of textile materials and to make them water-repellent, insofar as they are cationactive, to increase the fastness to water of dyeings which have been made with dyestuffs containing sulfonic acid groups. When the products of the present invention are used to make textiles fast to slipping or water-repellent, an aftertreatment at raised temperature can prove advantageous. The products can be used alone or in conjunction with other substances in common use in textile finishing, such as salts of weak acids.

The products of the present invention may be designated as methylene compounds in which a ring carbon atom of a resinous ether of a hydroxyaryl compound is connected through a bridge derived from at least one and at most two molecules of formaldehyde with a water-solubilizing group, which products are liquid to solid substances soluble to easily dispersible in water to form solutions to dispersions which are decomposed by boiling or by treating with alkalies, water-insoluble compounds being formed. By a bridge which is derived from at least one and at most two molecules of formaldehyde there is to be understood a bridge derived from one or two molecules of formaldehyde. The methylene bridge —$CH_2$— is a bridge deriving from one molecule of formaldehyde. A bridge which is derived from two molecules of formaldehyde is contained in the bridge —$CH_2$—O—$CH_2$—. The existence of a bridge which is derived from at least one and at most two molecules of formaldehyde brings about the technically valuable properties of the products of the present process, viz. their capability of being decomposed in the heat. If materials, such as textiles from cellulose, are impregnated with the water-soluble products of this invention and heated after drying, for instance to 120–150° C., residues which originate from the products of the present invention can be fixed on the treated material in a manner fast to washing, whereby especial effects, for instance a non-slip finish which is fast to washing, may be attained.

The following examples illustrate the invention, the parts being by weight:

Example 1

3 parts of the ether-like condensation product of α-naphthol with dipentene (B. P. 223–226° C./12 mm.) are stirred with 3.7 parts of α:α'-dichlorodimethyl ether, firstly for 1 hour in a bath at 90–100° C., then for 3 hours in a bath at 110–120° C. The volatile portion of the reaction mixture is then removed by distillation under reduced pressure in a bath at 90–100° C. The residue is dissolved in 30 parts by volume of dry acetone, undissolved matter is removed, if desired, by filtration, 1.6 parts of finely powdered thiourea are added, and the reaction mixture is stirred for about 4 hours at 40–45° C. After standing overnight, the acetone solution thus obtained is separated from a small quantity of resin which has separated on to the sides of the container, and petroleum ether is added. The reaction product, which separates out, is freed from traces of solvent. It is a powder that dissolves in water to form a weakly opalescent solution. This solution becomes very turbid on boiling and loses its foaming power. The new product can be used to make fabrics fast to slipping.

The ether-like condensation product of α-naphthol and dipentene which is used as parent material can be prepared in the same way as the ether obtained from carvene and naphthol, described in French Patent No. 539,494.

Example 2

5 parts of the ether-like condensation product from β-naphthol and dipentene (B. P. 180–190° C./0.5 mm.) are heated with 4.1 parts of α:α'-dichlorodimethyl ether and 0.05 part of powdered anhydrous zinc chloride whilst stirring for 1 hour in a bath at 60–65° C., and the volatile portion of the reaction mixture is then removed by distillation under reduced pressure in a bath at 60–80° C. 13 parts by volume of pyridine are added to the residue obtained, and the reaction mixture is heated for about 15 minutes in a boiling water bath, then allowed to stand at room temperature for some hours, when the solution is separated from any undissolved resin and petroleum ether is added. The reaction product which is precipitated, when freed from traces of solvent, is a powder which is readily soluble in water. The aqueous solution foams and precipitates dyestuffs which contain sulfonic acid groups from their solutions. The new product can be used to make fabrics fast to slipping.

The ether-like condensation product from β-naphthol and dipentene can be prepared in the same manner as the ether from carvene and β-naphthol described in French Patent No. 539,494.

Example 3

2.5 parts of the ether-like condensation product from dipentene and para-hydroxydiphenyl (B. P. 246–262° C./14 mm.) are heated with 2.8 parts of α:α'-dichlorodimethyl ether for about 5 hours in a bath at 90–100° C. whilst stirring. The volatile portion of the reaction mixture is then removed by distillation under reduced pressure at the same bath temperature. The residue thus obtained is dissolved in 15 parts by volume of dry acetone, small quantities of undissolved matter are removed by filtration. 1.5 parts of finely powdered thiourea are added, and the reaction mixture is stirred for 4 hours in a bath at 40–45° C. Petroleum ether is then added, and the precipitate is separated from the mother liquor and freed from traces of volatile matter. An almost colorless powder is obtained which, when dissolved in a little alcohol, gives a clear, foaming solution on addition of water. The solution precipitates dyestuffs which contain sulfonic acid groups and, on boiling, especially after addition of sodium acetate, decomposes with loss of foaming power.

The ether-like condensation product from dipentene and para-hydroxy-diphenyl which serves as parent material can be prepared in a similar manner to the ethers from α- or β-naphthol in accordance with the data given in French Patent No. 539,494. It is preferable to work as follows:

10 parts of sulfuric acid monohydrate are allowed to drop into a paste of 170 parts of powdered para-hydroxydiphenyl in 136 parts of dipentene over a period of 10 minutes whilst stirring at 50° C. The temperature rises rapidly to 110° C. by the heat of reaction. Stirring is continued for a further 5 hours at 110–115° C., when the temperature is raised to 170° C. and is maintained for 2 hours at 170–175° C. The reaction product is poured into water whilst still liquid and is freed from phenolic matter by exhaustive boiling with dilute sodium hydroxide solution and washing with water. It is then dried at about 90–95° C. in vacuo. An exceedingly sticky, yellow mass is obtained which may be still further purified by distillation under reduced pressure.

Instead of the ether above described resinous ethers of other hydroxyaryl compounds, for instance, ethers of resorcinol, 1:1-di-(para-hydroxyphenyl)-ethane with suitable alcohols such as terpineol, benzylic alcohol may be used. Further, a radical of the thiosulfuric acid may be introduced by condensing the chloromethyl derivatives described above with sodium thiosulfate. Instead of thiourea another thiourea capable of reacting in the isoform, for instance, allyl thiourea may be condensed with the chloromethyl derivatives mentioned above.

The condensation product obtained by reaction with thiourea which is described above can be used as follows to make fabrics fast to slipping:

A viscose rayon fabric, which has a tendency to slip, that is, the warp and weft threads of which are easily caused to slip over each other by mechanical strain, is impregnated with an aqueous solution of 0.5 per cent. strength of the product described above. It is then squeezed and dried on the calender at about 105–110° C. The material thus treated is very much faster to slipping than the untreated fabric.

What we claim is:

1. A methylene compound in which a ring carbon atom belonging to an aryl nucleus of a resinous ether of a hydroxyaryl compound with a member selected from the group consisting of cyclic terpene alcohols and cyclic terpene hydrocarbons is connected through a bridge selected from the group consisting of —CH₂— and —CH₂OCH₂— with a water-solubilizing radical selected from the group consisting of quaternary ammonium groups and the

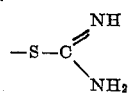

radical in which the basic nitrogen atom is neutralized with one equivalent of an acid.

2. A methylene compound in which a carbon atom belonging to an aryl nucleus of a resinous ether of a hydroxyaryl compound containing at least two benzene nuclei with a cyclic terpenic alcohol is connected through a bridge selected from the group consisting of —CH₂— and —CH₂OCH₂— with a water-solubilizing radical selected from the group consisting of quaternary ammonium groups and the

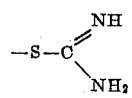

radical in which the basic nitrogen atom is neutralized with one equivalent of an acid.

3. A methylene compound in which a carbon atom belonging to an aryl nucleus of a resinous ether of a hydroxynaphthalene with dipentene is connected through a bridge selected from the group consisting of —CH₂— and —CH₂OCH₂— with the

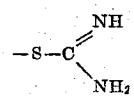

radical in salt form.

4. A methylene compound in which a carbon atom belonging to an aryl nucleus of a resinous ether of a hydroxy diphenyl with dipentene is connected through a bridge selected from the group consisting of —CH₂— and —CH₂OCH₂— with the

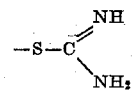

radical in salt form.

5. A methylene compound in which a carbon atom belonging to an aryl nucleus of a resinous ether of α-naphthol with dipentene is connected through a bridge selected from the group consisting of —CH₂— and —CH₂OCH₂— with the sulfur atom of the

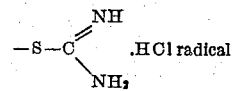

6. A methylene compound in which a carbon atom belonging to an aryl nucleus of a resinous ether of parahydroxydiphenyl with dipentene is connected through a bridge selected from the group consisting of —CH₂— and —CH₂OCH₂— with the sulfur atom of the

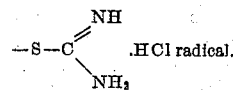

7. A process for the manufacture of a condensation product, which comprises condensing a resinous ether from a hydroxyaryl compound and from a member selected from the group consisting of cyclic terpene alcohols and cyclic terpene hydrocarbons with an equimolecular quantity of α:α'-dichlorodimethyl ether to form a chloromethyl derivative of the said ether.

8. A process for the manufacture of a condensation product, which comprises condensing a resinous ether from a hydroxyaryl compound and from a member selected from the group consisting of cyclic terpene alcohols and cyclic terpene hydrocarbons with an equimolecular quantity of α:α'-dichlorodimethyl ether to form a chloromethyl derivative of the said ether, and effecting a water-solubilizing step by condensing the resultant product with a solubilizing agent containing at least one nitrogen atom directly linked to at least one carbon atom and selected from the group consisting of tertiary amines, thioureas capable of reacting in the iso-form and dicyandiamide, whereby reactable chlorine of the chloromethyl group is transformed into a water-solubilizing group.

9. A process for the manufacture of a condensation product, which comprises condensing a resinous ether from a hydroxyaryl compound and from a cyclic terpenic alcohol with an equimolecular quantity of α:α'-dichlorodimethyl ether, to form a chloromethyl derivative of the said ether, and effecting a water-solubilizing step by condensing the resultant product with a solubilizing agent containing at least one nitrogen atom directly linked to at least one carbon atom and selected from the group consisting of tertiary amines, thioureas capable of reacting in the iso-form and dicyandiamide, whereby reactable chlorine of the chloromethyl group is transformed into a water-solubilizing group.

10. A process for the manufacture of a condensation product, which comprises condensing a resinous ether from a hydroxylaryl compound containing at least two benzene nuclei and from a cyclic terpenic alcohol with an equimolecular quantity of α:α'-dichlorodimethyl ether, to form a chloromethyl derivative of the said ether, and effecting a water-solubilizing step by condensing the resultant product with a solubilizing agent containing at least one nitrogen atom directly linked to at least one carbon atom and selected from the group consisting of tertiary amines, thioureas capable of reacting in the iso-form and dicyandiamide, whereby reactable chlorine of the chloromethyl group is transformed into a water-solubilizing group.

11. A process for the manufacture of a condensation product, which comprises condensing a resinous ether from a hydroxynaphthalene and from dipentene with an equimolecular quantity of α:α'-dichlorodimethyl ether, to form a chloromethyl derivative of the said ether, and transforming at least one chlorine atom of the chloromethyl derivative into a radical of the formula

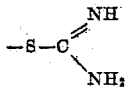

in which the basic nitrogen is neutralized with one equivalent of an acid, by condensing with a thiourea capable of reacting in the iso-form.

12. A process for the manufacture of a condensation product, which comprises condensing a resinous ether from a hydroxydiphenyl and from dipentene with an equimolecular quantity of α:α'-dichlorodimethyl ether, to form a chloromethyl derivative of the said ether, and transforming at least one chlorine atom of the chloromethyl derivative into a radical of the formula

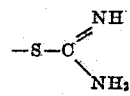

in which the basic nitrogen is neutralized with one equivalent of an acid, by condensing with a thiourea capable of reacting in the iso-form.

13. A process for the manufacture of a condensation product, which comprises condensing the resinous ether from β-naphthol and from dipentene with an equimolecular quantity of α:α'-dichlorodimethyl ether to form a chloromethyl derivative of the said ether, and transforming a chlorine atom of a chloromethyl group into the radical of the formula

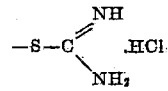

by condensing with thiourea.

14. A process for the manufacture of a condensation product, which comprises condensing the resinous ether from para-hydroxy-diphenyl and from dipentene with an equimolecular quantity of α:α'-dichlorodimethyl ether to form a chloromethyl derivative of the said ether, and transforming a chlorine atom of a chloromethyl group into the radical of the formula

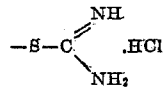

by condensing with thiourea.

OTTO ALBRECHT.
CHARLES GRAENACHER.
RICHARD SALLMANN.
CARLO ROSSI.